United States Patent
Brainard et al.

(10) Patent No.: US 9,225,717 B1
(45) Date of Patent: Dec. 29, 2015

(54) EVENT-BASED DATA SIGNING VIA TIME-BASED ONE-TIME AUTHENTICATION PASSCODES

(71) Applicant: EMC Corporation, Hopkinton, MA (US)

(72) Inventors: John Brainard, Sudbury, MA (US); Nikolaos Triandopoulos, Arlington, MA (US); Marten van Dijk, Somerville, MA (US); Ari Juels, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 228 days.

(21) Appl. No.: 13/826,924

(22) Filed: Mar. 14, 2013

(51) Int. Cl.
*G06F 7/04* (2006.01)
*G06F 15/16* (2006.01)
*G06F 17/30* (2006.01)
*H04L 29/06* (2006.01)
*G06F 12/00* (2006.01)
*G06F 12/14* (2006.01)
*G06F 13/00* (2006.01)
*G11C 7/00* (2006.01)
*H04L 9/06* (2006.01)

(52) U.S. Cl.
CPC ........... *H04L 63/0846* (2013.01); *H04L 9/0656* (2013.01); *H04L 9/0662* (2013.01)

(58) Field of Classification Search
CPC ... H04L 9/0656; H04L 9/0662; H04L 9/0668; H04L 9/20; H04L 9/22; H04L 9/24; H04L 9/26
See application file for complete search history.

(56) References Cited

U.S. PATENT DOCUMENTS

| 2009/0323972 | A1* | 12/2009 | Kohno et al. | 380/284 |
| 2010/0241850 | A1* | 9/2010 | Xiong | 713/155 |
| 2011/0197266 | A1* | 8/2011 | Chu et al. | 726/5 |

OTHER PUBLICATIONS

Mihir Bellare and Sara K. Miner, "A Forward-Secure Digital Signature Scheme", Jul. 1999, http://cseweb.ucsd.edu/~mihir/papers/fsig.pdf.*
ITKIS, Handbook of Information Security, chapter Forward Security: Adaptive Cryptography—Time Evolution. John Wiley and Sons, pp. 1-27, 2006.

* cited by examiner

*Primary Examiner* — Andrew Nalven
*Assistant Examiner* — Quy Pham
(74) *Attorney, Agent, or Firm* — Ryan, Mason & Lewis, LLP (57) ABSTRACT

Methods and apparatus are provided for signing data transactions using one-time authentication passcodes. User authentication passcodes are generated by generating a time-based user authentication passcode based on a forward-secure pseudorandom number, wherein the generated time-based user authentication passcode is used for authentication of the user; and generating an event-based user authentication passcode based on a forward-secure pseudorandom number, wherein the generated event-based user authentication passcode is used to sign one or more data transactions. The generation of an event-based user authentication passcode can be performed on-demand. The generation of the event-based user authentication passcode can optionally be performed substantially simultaneously with the generation of the time-based user authentication passcode.

22 Claims, 4 Drawing Sheets

EVENT-BASED DATA SIGNING VIA TIME-BASED ONE-TIME AUTHENTICATION PASSCODES

FIELD OF THE INVENTION

The present invention relates generally to one-time authentication tokens and, more particularly, to techniques for signing data transactions using such one-time authentication tokens.

BACKGROUND

One-time authentication tokens are used to realize two-factor authentication according to which a traditional user authentication method (using "something you know," such as a password or a personal identification number (PIN)) is augmented with a one-time passcode that is produced by an authentication token (i.e., a secret produced by "something you possess"). These two factors collectively provide a stronger authentication method implemented by having one-time authentication tokens producing passcodes that are provided by users, e.g., via typing, to authenticate themselves to a remote authentication server where the passcode is used only once in combination with a user-specific PIN of longer lifetime.

Existing one-time authentication tokens are employed exclusively in settings that require the authentication of users to a remote server with respect to some high-level application, an authentication step that is performed once, only at the beginning of a possibly long session established by the user and the remote server. However, many applications involve sessions that themselves involve one or more data transactions taking place during a session. In such cases, a user authentication validated at the beginning of a session does not provide full integrity protection for any data transactions occurring during the session. For instance, in an online e-banking application, a user may authenticate himself or herself using a two-factor authentication based on a one-time authentication token once at the log-in time, but during a possibly long session and interaction with the bank server, many critical data transactions may take place.

A need therefore exists for techniques for authenticating such transactions. For example, an attacker can perform a man-in-the-middle attack to initiate a malicious session with the server, or an attacker may get access to an old session where the legitimate user fails to appropriately terminate. In general, as attacks become more and more sophisticated, in many operational settings there is a need to additionally secure and protect the integrity of data transactions that take place during an initially authenticated session between a user and a server.

SUMMARY OF THE INVENTION

The present invention in the illustrative embodiments described herein provides methods and apparatus for signing data transactions using one-time authentication passcodes. According to one aspect of the invention, user authentication passcodes are generated by generating a time-based user authentication passcode based on a forward-secure pseudorandom number, wherein the generated time-based user authentication passcode is used for authentication of the user; and generating an event-based user authentication passcode based on a forward-secure pseudorandom number, wherein the generated event-based user authentication passcode is used to sign one or more data transactions.

The generation of an event-based user authentication passcode can be performed on-demand. In addition, the generation of the event-based user authentication passcode can optionally be performed substantially simultaneously with the generation of the time-based user authentication passcode.

The passcodes are optionally generated using a forward-secure pseudorandom number tree extended at a hierarchy level L to produce a hash chain of values $K_1, K_2, \ldots$, so that $K_i$ is a pseudorandom seed used for the i-th data transaction that is to be signed within a time interval $T_L$ that corresponds to the level L.

The disclosed exemplary techniques for signing data transactions using one-time authentication passcodes overcome one or more of the problems associated with the conventional techniques described previously. These and other features and advantages of the present invention will become more readily apparent from the accompanying drawings and the following detailed description.

DETAILED DESCRIPTION

Aspects of the present invention provide methods and apparatus for signing data transactions using one-time authentication tokens.

Figure 1:
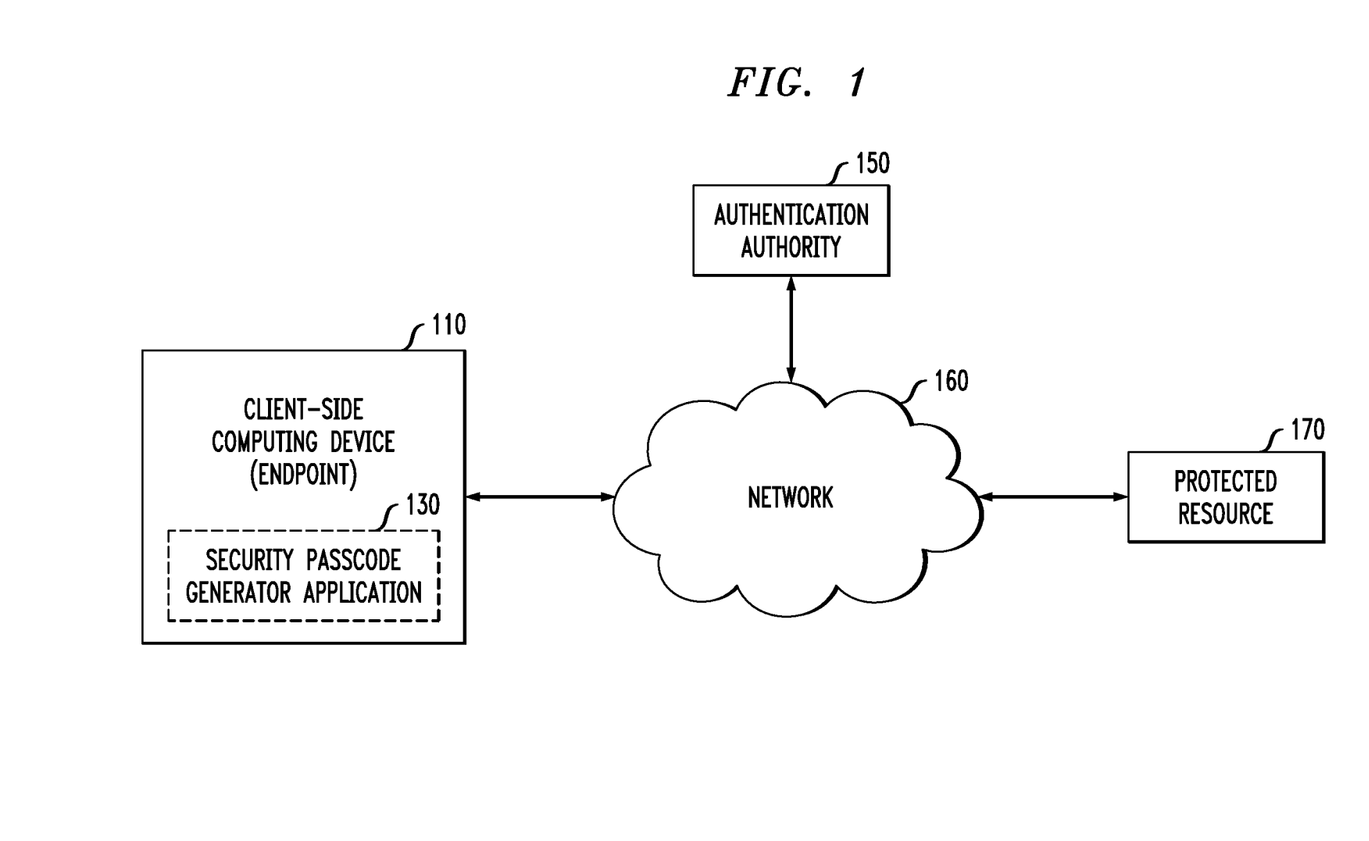
FIG. 1 illustrates an exemplary network environment in which the present invention can operate.

FIG. 1 illustrates an exemplary network environment in which a Secure Client-Server Communications application of the present invention can operate. As shown in FIG. 1, an exemplary client-side computing device (CSCD) 110 communicates with a protected resource 170 over a network 160. In an exemplary implementation, the user must authenticate with an authentication authority 150 using a passcode generated by a security passcode-generator application 130 (hereinafter, referred to as security passcode app 130) before obtaining access to the protected resource 170. The network 160, may comprise, for example, a global computer network such as the Internet, a wide area network (WAN), a local area network (LAN), a satellite network, a telephone or cable network, or various portions or combinations of these and other types of networks.

The user of the CSCD 110 is authenticated with the protected resource 170 using a one-time variable key that may be generated in accordance with the present invention. It is to be appreciated that a given embodiment of the disclosed system may include multiple instances of CSCD 110, security passcode app 130, authentication authority server 150 and protected resource 170, and possibly other system components, although only single instances of such components are shown in the simplified system diagram of FIG. 1 for clarity of illustration.

The security passcode app 130 is shown in FIG. 1 as being implemented by the CSCD 110. The security passcode app 130 may be implemented, for example, using the RSA SecurID® user authentication token commercially available from RSA Security Inc. of Bedford, Mass., U.S.A. The security passcode app 130 may be a server or other type of module that is accessible over the network 160, or it may be a software component resident on the CSCD 110. As another alternative, security passcode app 130 may be distributed over multiple devices, one of which may be the CSCD 110. Thus, while the present invention is illustrated herein using a security passcode app 130 executing on the CSCD 110, such that the CSCD 110 can read a given passcode (or another authentication value) directly from the security passcode app 130, other implementations are within the scope of the present invention, as would be apparent to a person of ordinary skill in the art. For example, for other security passcode apps 130 that are not connectable to a computer or other user device in this manner, the user may manually enter a password or another value displayed by the security passcode app 130 at the time of the attempted access. In addition, for a detailed discussion of a modular and/or component implementation of a token-based authentication technique, see, for example, U.S. Pat. No. 7,562,221 to Nystrom et al., assigned to the assignee of the present invention and incorporated by reference herein.

The CSCD 110 may represent a portable device, such as a mobile telephone, personal digital assistant (PDA), wireless email device, game console, etc. The CSCD 110 may alternatively represent a desktop or laptop personal computer (PC), a microcomputer, a workstation, a mainframe computer, a wired telephone, a television set top box, or any other information processing device which can benefit from the use of authentication techniques in accordance with the invention. The CSCD 110 may also be referred to herein as simply a "user." The term "user" should be understood to encompass, by way of example and without limitation, a user device, a person utilizing or otherwise associated with the device, or a combination of both. A password or other authentication information described as being associated with a user may, for example, be associated with a CSCD device 110, a person utilizing or otherwise associated with the device, or a combination of both the person and the device.

The authentication authority 150 is typically a third party entity that processes authentication requests on behalf of web servers and other resources, and verifies the authentication information that is presented by a CSCD 110.

The protected resource 170 may be, for example, an access-controlled application, web site or hardware device. In other words, a protected resource 170 is a resource that grants user access responsive to an authentication process, as will be described in greater detail below. The protected resource 170 may be, for example, a remote application server such as a web site or other software program or hardware device that is accessed by the CSCD 110 over a network 160.

Time-Based One-Time Authentication Tokens

Typically, such authentication tokens are time based as they produce new passcodes in fixed predetermined time intervals T. For instance, the widely used RSA SecurID® user authentication token commercially available from RSA Security Inc. of Bedford, Mass., U.S.A., produces passcodes every one minute. Time-based tokens often pre-compute secret information that allows them to compute t final or preliminary passcodes (called protocodes) in a batch, where these passcodes are successively used for every time interval T, to derive final passcodes. For instance, when the epoch T is 1 minute, t may be equal to 4, meaning that the underlying secret information is being computed in a batch every 4 minutes.

Additionally, recent designs for authentication tokens are equipped with anti-tampering capabilities. In particular, silent alarms for one-time authentication tokens are presented in U.S. patent application Ser. No. 13/404,788, filed Feb. 24, 2012, entitled "Methods and Apparatus for Silent Alarm Channels Using One-Time Passcode Authentication Tokens," incorporated by reference herein. Silent alarms allow tokens to detect and securely capture, store and later transmit (through a special channel) one or more secret alert messages that are related to a possible compromise, e.g., tampering or cloning, of the token. Silent alarms are, in turn, based on two techniques: forward security for evolving over time and protecting the secret state of the token (e.g., see the forward-secure pseudorandom generator in U.S. patent application Ser. No. 13/334,709, filed Dec. 23, 2011, entitled "Methods and Apparatus for Generating Forward Secure Pseudorandom Numbers," (now U.S. Pat. No. 9,008,303), incorporated by reference herein) and auxiliary channels between the token and the server for transmitting a few bits, e.g., 4 bits, of information embedded in subsequently produced passcodes (e.g., see the auxiliary channel in U.S. patent application Ser. No. 13/404,780, filed Feb. 24, 2012, entitled "Method and Apparatus for Embedding Auxiliary Information in One-Time Passcode Authentication Tokens," (now U.S. Pat. No. 8,984,609 incorporated by reference herein).

As indicated above, existing one-time authentication tokens are employed exclusively in settings that require the authentication of users to a remote server with respect to some high-level application, an authentication step that is performed once, only at the beginning of a possibly long session established by the user and the remote server. However, many applications involve sessions that themselves involve one or more data transactions taking place during a session. In such cases, a user authentication validated at the beginning of a session does not provide full integrity protection for any data transactions occurring during the session. It is desirable to authenticate such transactions that occur during a session.

Aspects of the present invention provide an extension of one-time authentication tokens to authenticate actions of a user, such as online data transactions. That is, a technique is provided that extends the core functionality of one-time authentication tokens to the authentication of data transactions in several new operational settings. In short, the disclosed scheme securely protects the integrity of any data transaction occurring during a session between a client and the server by computing, transiting and verifying a one-time special passcode that serves as a digital signature on the data used in the transaction. A solution is provided for transaction signing using an authentication token.

Figure 2:
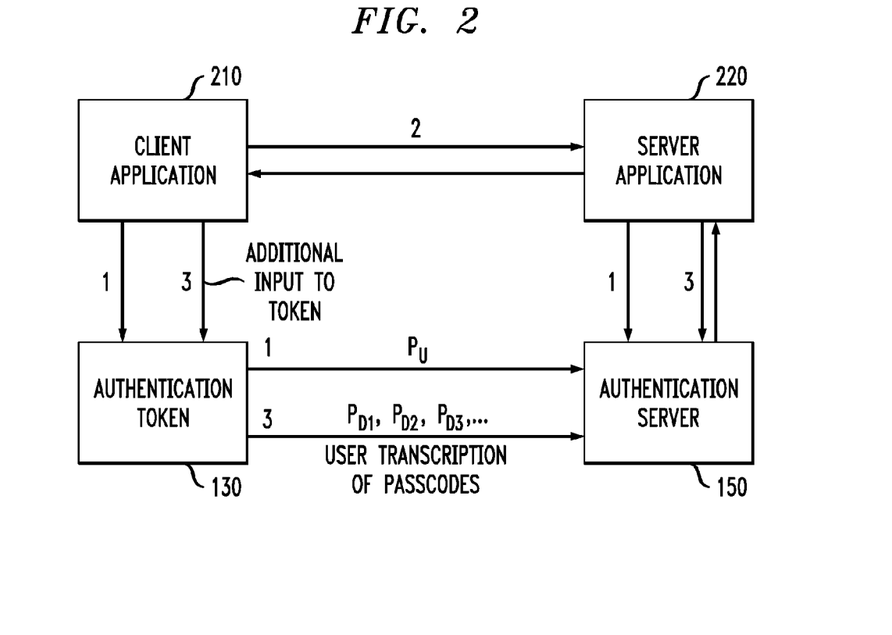
FIGS. 2 and 3 illustrate exemplary settings in which the present invention may be employed.

FIG. 2 illustrates a first exemplary setting in which the present invention may be employed, where the user is directly involved with the transcription of passcodes. As shown in FIG. 2, a client application 210, for example, executing on client-side computing device 110, is communicating with a server application 220, which may be a protected resource 170. The client application 210 may comprise, for example, an email application, or a banking application. During a first step (1), the user is authenticated in a conventional manner via passcode $P_U$ generated by the authentication token 130 and provided to the authentication server 150. The user is then authenticated to the server application 220.

The client application 210 communicates with the server application 220 during step 2, including data transactions. The data D1, D2, D3, . . . , associated with the transactions are signed during step 3 using the token 130 and event-based passcodes $P_{D1}$, $P_{D2}$, $P_{D3}$, . . . , in accordance with aspects of the present invention.

Figure 3:
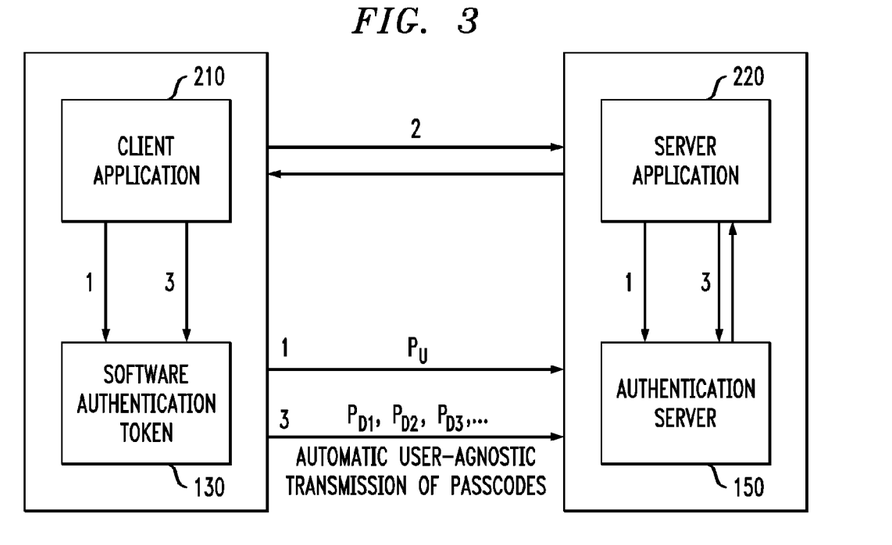

FIG. 3 illustrates a second exemplary setting in which the present invention may be employed, with automatic useragnostic transmission of passcodes. As shown in FIG. 3, a client application 210, for example, executing on client-side computing device 110, is again communicating with a server application 220, which may be a protected resource 170. The client application 210 may comprise, for example, an email application, or a banking application. During a first step (1), the user is authenticated in a conventional manner via passcode $P_U$ generated by a software authentication token 130 and provided to the authentication server 150. The user is then authenticated to the server application 220. The client application 210 and software authentication token 130 are typically integrated by executing on a single client-side computing device 110.

The client application 210 communicates with the server application 220 during step 2, including data transactions. The data D1, D2, D3; . . . , associated with the transactions are signed during step 3 using the software token 130 and event-based passcodes $P_{D1}$, $P_{D2}$, $P_{D3}$, . . . , in accordance with aspects of the present invention. The generated time and event-based passcodes $P_U$, $P_{D1}$, $P_{D2}$, $P_{D3}$, . . . are sent to the authentication server 150 without any user involvement. This mode of operation of one-time authentication tokens is referred to as "connected mode," as the token 130 itself is integrated with the client application 210 and thus is connected with the server-side application 220 and, in turn, the authentication server 150, without the need for user involvement for transmitting passcodes to the server.

Figure 4:
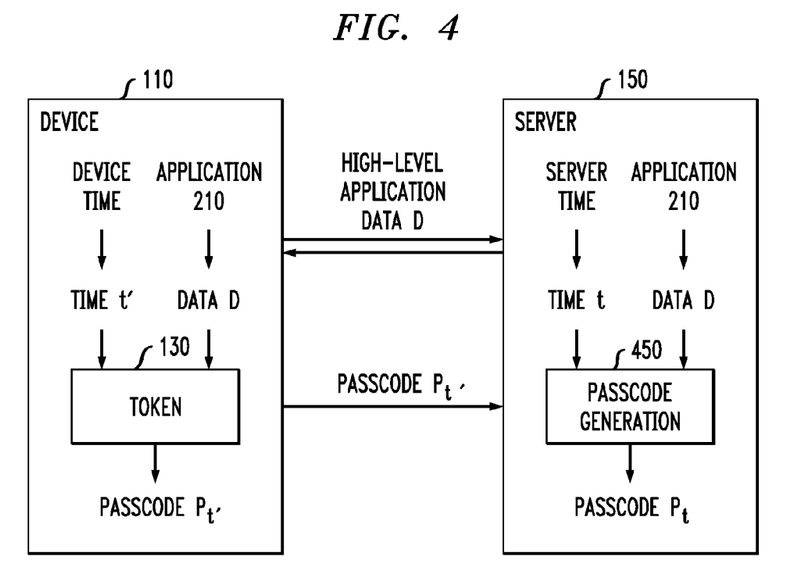
FIG. 4 illustrates a user device attempting to authenticate a user and/or a data transaction to a server.

FIG. 4 illustrates a user device 110 attempting to authenticate to a server 150. As shown in FIG. 4 and as discussed further below in conjunction with FIG. 5, the user device 110 authenticates to the server 150 by providing the passcode $P_{t'}$, that is based on the current time t' (at the epoch level, e.g., minute) that the device 110 knows and the application data D. Then, as shown in FIG. 4, the server 150 must authenticate a user who provides a candidate passcode P' by first recomputing the passcode $P_t$ using a passcode generation block 450 that is based on the current time t (at the epoch level) that the server 150 knows and the application data D, and then accepting the submitted passcode if and only if P'=$P_t$. The application data D is communicated to the server via communication through some high-level applications.

The exemplary embodiment satisfies the following functional properties:

Event-Based Transaction Signing: Transaction signing occurs in an event-based fashion, whenever the user/client needs to perform one or more transactions. This contradicts the time-based nature of current authentication tokens, thus enhancing the tokens with an additional event-based passcode generation for data signing The exemplary data-transaction scheme is designed to support both the standard time-based operational mode of tokens and the new required event-based mode for transactional signing.

Forward Security: The exemplary data-transaction scheme is compatible to the use of a forward-secure pseudorandom generator in the authentication token. Accordingly, data signing in the authentication token can operate together with silent alarms to fully support recent security advancements in tokens. The exemplary data-transaction scheme supports forward security for data signing and the efficient signing verification at the server.

Forward-Secure Transaction Signing in Authentication Tokens

As discussed above, aspects of the present invention produce passcodes in a one-time authentication token 130 that incorporate a signature over data that is specific to a user's transaction.

General Framework

The exemplary transaction-signing method allows passcodes to be produced that can be used to authenticate the validity of a user's transaction by generally executing the following steps:

1. As discussed above in conjunction with FIG. 4, the one-time authentication token 130 is augmented to receive as additional input some external data, D, of arbitrary length, possibly concatenated with meta-data that describes the input data D (e.g., time that the transaction takes place) and/or the token 130 (e.g., unique, token-specific identifier).

Figure 5:
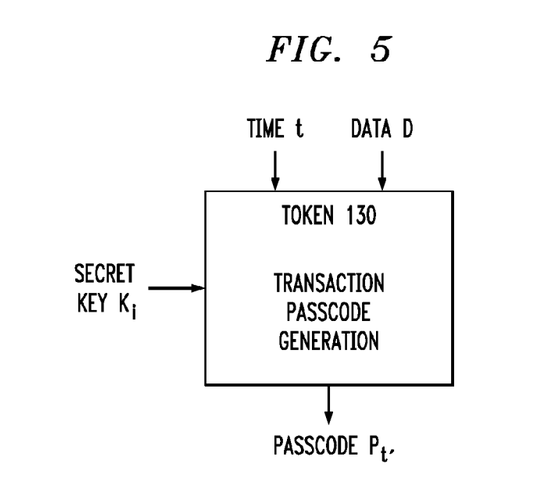
FIG. 5 illustrates a data transaction signing method in accordance with aspects of the present invention.

2. FIG. 5 illustrates a data transaction signing method in accordance with aspects of the present invention. As shown in FIG. 5, the additional input data D is combined through a one-way cryptographic function h with the seed or secret state $K_i$ (corresponding to ith transaction in current $T_L$ time epoch) of the token 130 which evolves in a forward-secure way to produce an authentication passcode $P_t$ that encodes the given transaction data D and the current time t and serves as a digital signature or message authentication code of the input data and meta data, as follows:

$$P_t = h(K_i, t, D)$$

where h is a one-way cryptographic hash function, such as $P_t = MAC_{K_i}(t, D)$.

3. The produced passcode $P_t$ is transmitted with or without user's intervention to the server (FIGS. 2 and 3, respectively). That is, the authentication passcode $P_t$ is provided to a receiving authentication server 150 either through user's typing (FIG. 2) or automatically using a secure communication channel that is transparent to the user (FIG. 3). The receiving authentication server 150 is responsible for handling and processing the actual transaction (between the user 110 and server application 220) that takes place through a separate high-level application with data being exchanged via a different communication channel (e.g., through an on-line e-banking session where a user has logged in the bank's web site to perform a financial transaction).

4. The authentication server 150 verifies the high-level application transaction of the user using this provided authentication passcode $P_{t'}$, by contrasting it with the passcode $P_t$ that is locally computed by the server 150 using as inputs the seed or secret state $K_i$ corresponding to the current time of the server 150 and the transaction data D that the server 150 receives through the high-level application. That is, the received authentication passcode $P_{t'}$ is verified against the authentication passcode $P_t$ that is produced by the server 150 based on its local secret state and time and the external data and meta data received by the server over a different channel, as shown in FIG. 4.

The produced passcode $P_{t'}$, by the token 130 serves as a signature of a data transaction that is being inputted to the token 130. The receiving server 150 can then verify the passcode $P_{t'}$, as being the correct signature of the data that is delivered to the server. Many online interactive applications between a client 210 and a server 220, e.g., related to electronic banking, can be securely protected using the above primitive.

Technical Challenges

A basic approach for transactional signing via authentication tokens has been incorporated into a recent version of an authentication token, but this prior approach implemented a data-signing feature only for the standard version of one-time authentication tokens where the unique, original seed of the token is used directly as input for the passcode generation. However, recent advancements on the design of authentication tokens, see, e.g., U.S. patent application Ser. No. 13/404, 788, filed Feb. 24, 2012, entitled "Methods and Apparatus for Silent Alarm Channels Using One-Time Passcode Authentication Tokens;" U.S. patent application Ser. No. 13/404,780, filed Feb. 24, 2012, entitled "Method and Apparatus for Embedding Auxiliary Information in One-Time Passcode Authentication Tokens;" (now U.S. Pat. No. 8,984,609), and/or U.S. patent application Ser. No. 13/334,709, filed Dec. 23, 2011, entitled "Methods and/or Apparatus for Generating Forward Secure Pseudorandom Numbers," (now U.S. Pat. No. 9,009,303), each incorporated by reference herein, employ a suite of cryptographic/coding techniques that harden the security of authentication tokens against cloning or tampering attacks using forward security for passcode generation. Forward security, unfortunately, is not compatible with the existing basic approach. Therefore, it is crucial that the exemplary principles described above employ new designs and implementations that are compatible with forward security.

Forward security constitutes the basis to harden the security of one-time passcode-based authentication against tampering of the hardware token or intrusions to the host endpoint device of the software tokens. It involves having the secret states be evolving over time in a "one-way" manner so that possible leakage of the current state does not compromise the security of past states of the token. In order to implement this idea, a forward-secure pseudorandom generator (FS-PRNG) is used that generates one-time "seeds" or secret states in a time-based fashion, one every basic time unit T (typically, 1 minute).

Data signing is challenging to support with time-based authentication tokens (such as SecurID®) because data signing should be an event-based operation, not a time-based one. That is, the token should allow for a mode of operation so that a user or application is able to produce t>>1 signed transactions within a relatively small time window, even during the elementary time unit T in which one-time passcodes are being generated by the token 130. For instance, although passcodes are typically generated at a rate of one passcode per minute, the token 130 should be able to sign many data transactions per minute, e.g., 100 transactions in a minute. Note that this high transaction-signing rate is feasible in practice because, as noted above, in tokens in the connected mode passcodes need not be typed by a user, but they might be transmitted (fast) automatically by an underlying channel to the authentication server 150.

At the same time, the event-based mechanism that is used to support data signing should be compatible with the forward security aspect of the general design of the token 150. The exemplary tokens 150 combine time-based forward-secure passcode generation with event-based forward-secure data signing.

The exemplary embodiments described herein adhere to the following design goals:

1. The tokens 130 support both time-based forward-secure regular passcode generation for user authentication and event-based forward-secure data-signing passcodes for user transaction authentication;

2. Given that passcode verification at the server 150 typically involves searching in a window of many possible passcodes (e.g, in a slack window of 70 minutes, due to inherent imperfect synchronization between the token 130 and the server 150), the server's search cost should not be affected negatively by the addition of the event-based data-signing feature.

3. The token 130 supports many modes of operation, where the same design allows for any combination of the following features:

(a) Both regular passcodes and data-signing authentication passcodes can be produced by the token 130, even simultaneously (i.e., within the same elementary time unit, e.g., of one minute);

(b) One or more of the security features of the new SecurID®design, namely Silent Alarms (referenced above), Drifting Keys (U.S. patent application Ser. No. 13/250,225, filed Sep. 30, 2011, entitled "Key Update With Compromise Detection," incorporated by reference herein), and/or Multi-Server Authentication (U.S. patent application Ser. No. 13/404,737, filed Feb. 24, 2012, entitled "Method and Apparatus for Authenticating a User Using Multi-Server One-Time Passcode Verification," (now U.S. Pat. No. 9,118,661), incorporated by reference herein), can be selectively used in combination with any type of generated passcode (regular or data-signing) through the use of an auxiliary channel (referenced above).

Data-Signing Passcodes

An exemplary data-signing passcode solution entails the following exemplary design as an augmentation of a time-based token that makes use of a FS-PRNG generator, so that anti-breech and anti-cloning extra features can also be supported.

Typically, the FS-PRNG structure is organized as an infinite tree, where tree nodes correspond to one-time forward-secure seeds and, in particular, leaves correspond to the final seeds/secret keys, where one leaf corresponds to a given elementary time unit T (e.g., minute). The tree is divided into N levels where a seed in a given level t is used to derive all the leaves in a time interval T, that is a multiple of the elementary time unit. Typically, the levels correspond to hours, days, weeks, etc.

Figure 6:
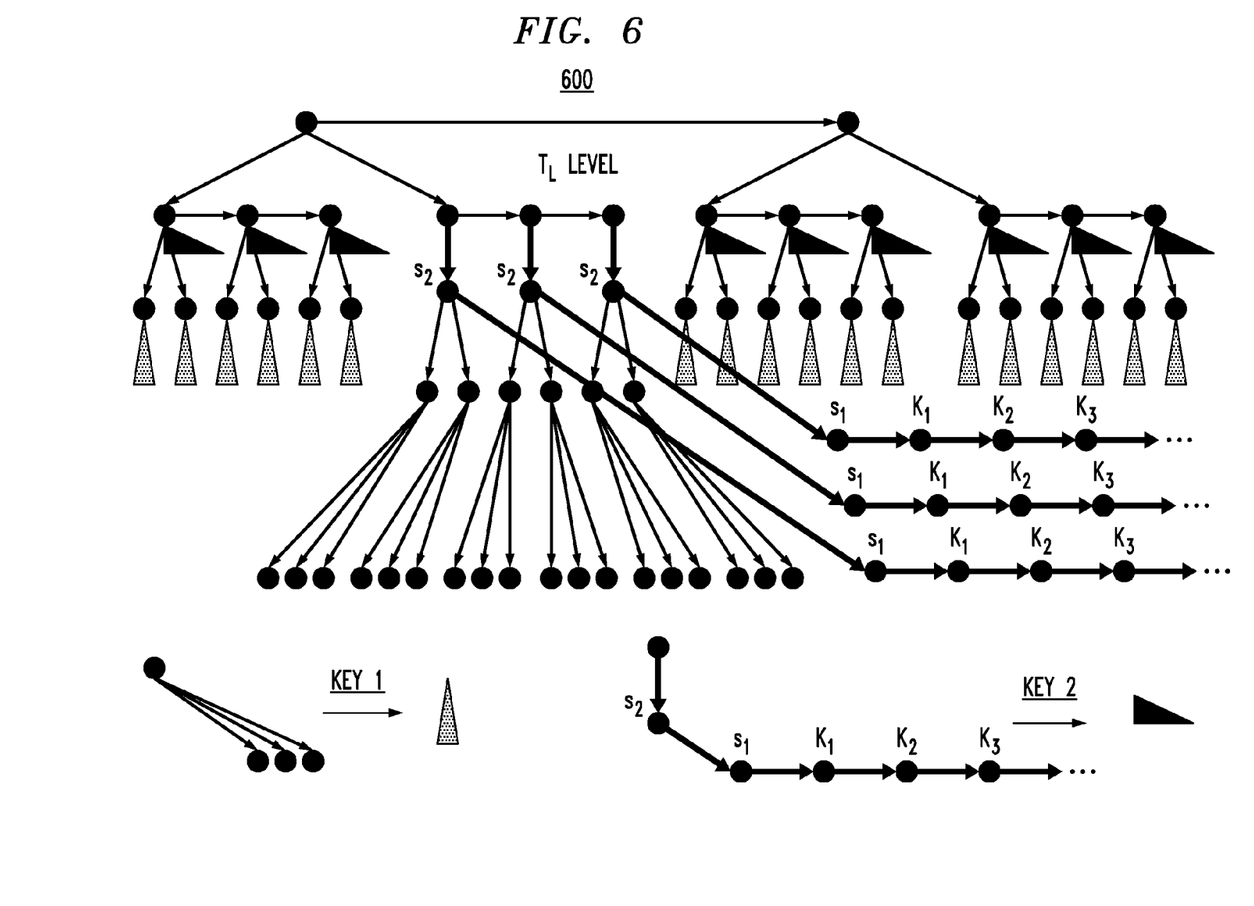
FIG. 6 illustrates an exemplary (3, (2,2), (3,2), (1,3), 1) FS-PRNG tree augmented in accordance with aspects of the present invention.

FIG. 6 illustrates an exemplary augmented (3, (2,2), (3,2), (1,3), 1) tree 600. The exemplary tree 600 shown in FIG. 6 has a depth of 3 and 4 levels. The first level (level 0) has a chain length of 2, and a degree of 2. The second level (level 1) has a chain length of three, and a degree of two. The third level (level 2) has a chain length of one, and a degree of three. Finally, the fourth level (level 3) has a chain length of one (and no children).

The FS-PRNG structure 600 of FIG. 6 is extended at a special hierarchy level L to produce a hash chain of values $K_1$, $K_2$, ..., so that $K_i$ is some pseudorandom seed used for the i-th data transaction that is to be signed within a time interval $T_L$ that corresponds to the level L. For instance, if L corresponds to 1 hour, then $K_1$, $K_2$ ... is a unique hash sequence that is associated with an hour in the timeline of the token. This way the token may utilize an arbitrarily long number of transactions within the time window L (1 hour). Note that the narrower the level L, the harder it becomes for the server 150 to verify the signatures/passcodes for data transactions, as discussed below.

Moreover:

(a) Each seed s that corresponds to a particular time unit $T_L$ (e.g., hour) is split into two new seeds $s_1$ and $s_2$ as follows: $s_1 = h(s, event)$, $s_2 = h(s, time)$ where h is a collision-resistant and unpredictable one-way hash function.

i. Seed $s_2$ is used to derive seeds for the next (lower) level in the tree (e.g., corresponding to time of 1 minute).

ii. Seed $s_1$ is used to derive a hash chain that consists of seeds $K_1, K_2, \ldots$ where $K_1 = h(s_1, next)$, $K_2 = h(K_1, next)$, $K_3 = h(K_2, next)$, etc. Here, the operands 'event', 'time' and 'next' of function h are unique identifiers used to differentiate the type of the new seed that is computed by function h. Seeds $K_i$ are computed on-demand as needed by the application in order to sign a data transaction as explained in the next step.

Given a transaction signing seed $K_i$ an input data is signed as follows:

(a) Apply a hash or MAC function (e.g., using CMAC) $T_c \| D$, where $T_c$ is the current time of the token's machine when the transaction signing happens along with a fixed unique encoding of the specific token in use, and D is the data to be signed, using as secret key the current (available and unused) value $K_i$ where $K_1$ belongs in the sequence corresponding to the hour $T_{L,c}$ that $T_c$ belong in. The time $T_c$ is considered to be part of the data that is transmitted to and received by the server via the high-level application. For a more detailed discussion of CMAC (Cipher-based MAC), see, for example, "Recommendation for Block Cipher Modes of Operation: The CMAC Mode for Authentication," National Institute of Standards and Technology, Special Publication 800-38B, May 2005.

(b) The output of the MAC function:

i. May be directly converted to the current (to be transmitted) passcode (e.g., 8 digits);

ii. Or may be used as a protocode that is further mapped to a final transmitted passcode after first incorporating some additional security-related bits (e.g., 1 silent alarm bit and 2 drifting key bits) through the use of an auxiliary channel for one-time authentication tokens. That is, if an auxiliary channel is used to embed auxiliary information into the passcode, then the MAC is considered to be the protocode to which the auxiliary channel adds a "shift" value to finally form the passcode. It is noted that the above design is general and can be incorporated in more sophisticated one-time authentication designs. For instance, if split-state multi-server (Red and Blue) technologies are in use, referenced above, then $K_1$ may be the XOR of $K_{i,Red}$ and $K_{i,Blue}$.

The data signing techniques described herein can be employed independently of the use of the extra security features, e.g., silent alarms, drifting keys and auxiliary channels. That is, the signature generated by applying the MAC function can be itself used as a passcode.

In addition, the data signing techniques described herein can optionally be employed in combination with a lower-level auxiliary channel for embedding silent alarms and drifting keys information into one or more bits, where each bit is the pseudorandom sampling (hash code/value) of the corresponding silent alarm and drifting keys states, where additionally:

(a) The same sampling is used for consecutive transaction signings within the same elementary time unit (e.g., one minute);

(b) Different sampling are used for consecutive transaction signings within the same elementary time unit (e.g., one minute); this is done by employing corresponding "event-based data signing" hash chains for re-sampling purposes, one such chain for each leaf of the FS-PRNG tree.

It is again noted that by separating the two levels in the FS-PRNG tree 600 (FIG. 6) that generate the event-based data-signing seeds, namely, the level L in the tree 600 which does not correspond to the lowest level of the tree leafs and the time-based seeds at the lowest tree level for generating regular passcodes, both modes of operation can be combined in a single FS-PRNG tree.

Similarly, by using an event-passcode level L that is higher than the depth of the FS-PRNG tree, no high costs are introduced at the server 150 in order to verify a data-signing passcode. At all times the server 150 maintains a counter c of the number of data-signing passcodes received and authenticated within the current L-level time interval (e.g., last hour). Given a received passcode, if this passcode is a passcode for signing a data transaction, then the server 150 operates as follows. If this passcode does not incorporate auxiliary information, then the server 150 checks this passcode directly against the MAC value applied on the candidate data and the c-th hash value in the hash chain of the current hour. If this passcode incorporates auxiliary information then the server 150 first computes the candidate MAC value (using the candidate data and the c-th hash value in the hash chain of the current hour), then it digit-wise subtracts this from the received passcode to get a candidate "shift" value. Then the lowest-level seed is used (as in the regular token mode, by searching in a corresponding slack window for a matching of the candidate "shift" value) to perform the final verification test. Thus, the verification cost at the server 150 is exactly the same as it is for regular passcodes. If instead level L was the last (lowest) level in the tree 600, then the server 150 would have, in the worst case, to search in a space of seeds that is greater by a factor of w, where w is the maximum allowed length of a hash chain of level L when L is the lowest level in the tree 600 (e.g., w may have a typical value of 100 data-signing operation's per minute).

By making use of the high-level application, the server in the passcode verification procedure above can identify whether a received passcode is a standard user-authentication passcode or a data-transaction passcode.

Finally, as explained above, many different modes of operations are supported, depending on whether or not the data signature is a protocode or the final passcode, and also depending on whether consecutive data signings occur within the lowest time unit (a minute) or not.

CONCLUSION

As previously indicated, the above-described embodiments of the invention are presented by way of illustrative example only. Numerous variations and other alternative embodiments may be used, as noted above. The present invention provides new general-purpose techniques for improving resilience to forward clock attacks.

Additional details regarding certain conventional cryptographic techniques referred to herein may be found in, e.g., A. J. Menezes et al., Handbook of Applied Cryptography, CRC Press, 1997, which is incorporated by reference herein.

Advantageously, the illustrative embodiments do not require changes to existing communication protocols. It is therefore transparent to both existing applications and communication protocols.

While exemplary embodiments of the present invention have been described with respect to processing steps in a software program, as would be apparent to one skilled in the art, various functions may be implemented in the digital domain as processing steps in a software program, in hardware by a programmed general-purpose computer, circuit elements or state machines, or in combination of both software and hardware. Such software may be employed in, for example, a hardware device, such as a digital signal processor, application specific integrated circuit, micro-controller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits. The invention can also be implemented in one or more of an integrated circuit, a digital signal processor, a microprocessor, and a micro-controller.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, memory cards, semiconductor devices, chips, application specific integrated circuits (ASICs)) or may be a transmission medium (e.g., a network comprising fiber-optics, the worldwide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It should again be emphasized that the particular authentication and communication techniques described above are provided by way of illustration, and should not be construed as limiting the present invention to any specific embodiment or group of embodiments. Also, the particular configuration of system elements, and their interactions, may be varied in other embodiments. Moreover, the various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

What is claimed is:

1. A method for generating one or more user authentication passcodes, comprising:
generating a time-based user authentication passcode based on a first forward-secure pseudorandom number;
generating an event-based user authentication passcode based on a second forward-secure pseudorandom number, wherein said first forward-secure pseudorandom number is generated using at least one hardware device using a first seed from a first level of a hierarchical forward-secure pseudorandom number tree stored in a memory and wherein said second forward-secure pseudorandom number is generated using said at least one hardware device using a second seed from a different, second level of said hierarchical forward-secure pseudorandom number tree;
providing said generated time-based user authentication passcode for authentication of a user; and
providing said generated event-based user authentication passcode for signing of one or more data transactions of said user during a session of said user.

2. The method of claim 1, wherein said step of generating an event-based user authentication passcode is performed on-demand.

3. The method of claim 1, wherein said two generating steps can be performed substantially simultaneously.

4. The method of claim 1, wherein said method employs said hierarchical forward-secure pseudorandom number tree extended at a hierarchy level L to produce a hash chain of values $K_1, K_2, \ldots$, so that $K_i$ is a pseudorandom seed used for the i-th data transaction that is to be signed within a time interval $T_L$ that corresponds to the level L.

5. The method of claim 4, wherein each seed s in said hierarchical forward-secure pseudorandom number tree corresponding to a particular time unit $T_L$ is split into two new seeds $s_1$ and $s_2$ as follows: $s_1 = h(s, \text{event})$, $s_2 = h(s, \text{time})$ where h is a collision-resistant and unpredictable one-way hash function.

6. The method of claim 4, wherein said step of generating said event-based user authentication passcode further comprises the step of applying a function on $T_c \| D$, where is a current time of a token when said transaction signing occurs and a fixed unique encoding of said token, and wherein D is said data to be signed, using as secret key the current value $K_1$, where $K_1$ belongs in the sequence corresponding to the time interval $T_{L,c}$ that $T_c$ belongs in.

7. The method of claim 6, wherein said function comprises one or more of a cryptographic hash function and a message authentication code.

8. A non-transitory machine-readable recordable storage medium for generating one or more user authentication passcodes, wherein one or more software programs when executed by one or more processing devices implement the following steps:
generating a time-based user authentication passcode based on a first forward-secure pseudorandom number;
generating an event-based user authentication passcode based on a second forward-secure pseudorandom number, wherein said first forward-secure pseudorandom number is generated using a first seed from a first level of a hierarchical forward-secure pseudorandom number tree stored in a memory and wherein said second forward-secure pseudorandom number is generated using a second seed from a different, second level of said hierarchical forward-secure pseudorandom number tree;
providing said generated time-based user authentication passcode for authentication of a user; and
providing said generated event-based user authentication passcode for signing of one or more data transactions of said user during a session of said user.

9. A time-based authentication token, comprising:
a passcode generation function for generating a time-based user authentication passcode based on a first forward-secure pseudorandom number;
a transaction passcode generation function for generating an event-based user authentication passcode based on a second forward-secure pseudorandom number, wherein said first forward-secure pseudorandom number is generated using a first seed from a first level of a hierarchical forward-secure pseudorandom number tree stored in a memory and wherein said second forward-secure pseudorandom number is generated using a second seed from a different, second level of said hierarchical forward-secure pseudorandom number tree;

wherein said time-based authentication token provides said generated time-based user authentication passcode for authentication of a user and provides said generated event-based user authentication passcode for signing of one or more data transactions of said user during a session of said user.

10. The time-based authentication token of claim 9, wherein said generation of an event-based user authentication passcode is performed on-demand.

11. The time-based authentication token of claim 9, wherein said two generation functions can be employed substantially simultaneously.

12. The time-based authentication token of claim 9, wherein said token employs said hierarchical forward-secure pseudorandom number tree extended at a hierarchy level L to produce a hash chain of values $K_1, K_2, \ldots$, so that $K_1$ is a pseudorandom seed used for the i-th data transaction that is to be signed within a time interval $T_L$ that corresponds to the level L.

13. The time-based authentication token of claim 12, wherein each seed s in said hierarchical forward-secure pseudorandom number tree corresponding to a particular time unit $T_L$ is split into two new seeds $s_1$ and $s_2$ as follows: $s_1=h(s, \text{event})$, $s_2=h(s,\text{time})$ where h is a collision-resistant and unpredictable one-way hash function.

14. The time-based authentication token of claim 12, wherein said generation of said event-based user authentication passcode applies a function on $T_c \| D$, where $T_c$ is a current time of said token when said transaction signing occurs and a fixed unique encoding of said token, and wherein D is said data to be signed, using as secret key the current value $K_1$, where $K_1$ belongs in the sequence corresponding to the time interval $T_{L,c}$ that $T_c$ belongs in.

15. The time-based authentication token of claim 14, wherein said function comprises one or more of a cryptographic hash function and a message authentication code.

16. An apparatus for generating one or more user authentication passcodes, the apparatus comprising:
a memory; and
at least one hardware device, coupled to the memory, operative to implement the following steps:

generating a time-based user authentication passcode based on a first forward-secure pseudorandom number,
generating an event-based user authentication passcode based on a second forward-secure pseudorandom number, wherein said first forward-secure pseudorandom number is generated using a first seed from a first level of a hierarchical forward-secure pseudorandom number tree stored in a memory and wherein said second forward-secure pseudorandom number is generated using a second seed from a different, second level of said hierarchical forward-secure pseudorandom number tree;
providing said generated time-based user authentication passcode for authentication of a user; and
providing said generated event-based user authentication passcode for signing of one or more data transactions of said user during a session of said user.

17. The apparatus of claim 16, wherein said of generation of an event-based user authentication passcode is performed on-demand.

18. The apparatus of claim 16, wherein said two generating steps can be performed substantially simultaneously.

19. The apparatus of claim 16, wherein one or more of said two generating steps employ said hierarchical forward-secure pseudorandom number tree extended at a hierarchy level L to produce a hash chain of values $K_1, K_2, \ldots$, so that $K_i$ is a pseudorandom seed used for the i-th data transaction that is to be signed within a time interval $T_L$ that corresponds to the level L.

20. The apparatus of claim 19, wherein each seed s in said hierarchical forward-secure pseudorandom number tree corresponding to a particular time unit $T_L$ is split into two new seeds $s_1$ and $s_2$ as follows: $s_1=h(s,\text{event})$, $s_2=h(s,\text{time})$ where h is a collision-resistant and unpredictable one-way hash function.

21. The apparatus of claim 19, wherein said step of generating said event-based user authentication passcode further comprises the step of applying a function on $T_c \| D$, where $T_c$ is a current time of a token when said transaction signing occurs and a fixed unique encoding of said token, and wherein D is said data to be signed, using as secret key the current value $K_1$, where $K_i$ belongs in the sequence corresponding to the time interval $T_{L,c}$ that $T_c$ belong in.

22. The apparatus of claim 21, wherein said function comprises one or more of a cryptographic hash function and a message authentication code.

* * * * *